US011811813B2

(12) United States Patent
Sivagnanam et al.

(10) Patent No.: US 11,811,813 B2
(45) Date of Patent: Nov. 7, 2023

(54) NETWORK SECURITY MANAGEMENT FOR A BUILDING AUTOMATION SYSTEM

(71) Applicant: TRANE INTERNATIONAL INC., Davidson, NC (US)

(72) Inventors: Mangayarkarasi Sivagnanam, White Bear Lake, MN (US); Thomas A. Fletcher, North Oaks, MN (US); David C. Holst, Eagan, MN (US); Glenn Richard Gasmen, Houlton, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 887 days.

(21) Appl. No.: 16/235,195

(22) Filed: Dec. 28, 2018

(65) Prior Publication Data
US 2020/0213344 A1   Jul. 2, 2020

(51) Int. Cl.
H04L 9/40 (2022.01)
G05B 15/02 (2006.01)

(52) U.S. Cl.
CPC .......... H04L 63/1433 (2013.01); G05B 15/02 (2013.01)

(58) Field of Classification Search
CPC .................................................. H04L 63/1433
See application file for complete search history.

(56) References Cited

U.S. PATENT DOCUMENTS 8,302,196 B2 * 10/2012 Soderberg ............. G06F 21/577
                                                              709/224
8,892,897 B2 * 11/2014 Swann .................... G06F 21/46
                                                              713/182

(Continued)

FOREIGN PATENT DOCUMENTS

EP        3188436 A1      7/2017
WO    WO-02096013 A1 *  11/2002  ......... H04L 12/2602
WO    WO-2015126354 A1 *  8/2015  ....... G06F 17/30867

OTHER PUBLICATIONS

Kelley et al, "Guess again (and again and again): Measuring password strength by simulating password-cracking algorithms"), p. 523-537. (Year: 2012).*

(Continued)

*Primary Examiner* — Ponnoreay Pich
(74) *Attorney, Agent, or Firm* — Hamre, Schumann, Mueller & Larson, P.C.

(57) ABSTRACT

A computer-implemented method and building automation system, the building automation system including a network of electronic devices connected in electronic communication. The method includes initiating an electronic security scan of the controller. The controller electronically assesses security vulnerabilities of the controller, including identifying one or more of a validation of whether the controller is protected by a firewall or other network security device, identifying which communication ports are open, identifying and verifying an Ethernet and Wi-Fi configuration of the controller, determining whether any routers communicating with the controller are protected by the firewall or other network security device, determining whether the controller is running an up-to-date software or firmware version, and determining a listing of software applications and versions installed on the controller. The controller calculates a risk score and listing of recommendations for resolving security vulnerabilities of the controller based on the electronically assessing security vulnerabilities of the controller.

18 Claims, 7 Drawing Sheets

(56) References Cited

U.S. PATENT DOCUMENTS

| | | | | |
|---|---|---|---|---|
| 9,241,007 | B1* | 1/2016 | Witter | H04L 63/1433 |
| 9,438,419 | B1* | 9/2016 | Aggarwal | H04L 9/0863 |
| 10,523,643 | B1* | 12/2019 | Davis | H04L 63/20 |
| 10,917,400 | B1* | 2/2021 | Goings | H04L 63/0846 |
| 2006/0010485 | A1* | 1/2006 | Gorman | H04L 67/34 |
| | | | | 726/3 |
| 2008/0235801 | A1* | 9/2008 | Soderberg | G06F 21/563 |
| | | | | 726/25 |
| 2008/0320582 | A1* | 12/2008 | Chen | H04L 63/0245 |
| | | | | 726/13 |
| 2009/0241187 | A1* | 9/2009 | Troyansky | H04L 63/1433 |
| | | | | 726/22 |
| 2011/0277034 | A1* | 11/2011 | Hanson | G06F 21/554 |
| | | | | 709/224 |
| 2012/0180133 | A1* | 7/2012 | Al-Harbi | H04L 63/1433 |
| | | | | 726/25 |
| 2014/0199663 | A1* | 7/2014 | Sadeh-Koniecpol | |
| | | | | H04L 63/1408 |
| | | | | 434/118 |
| 2014/0237545 | A1* | 8/2014 | Mylavarapu | H04L 63/1441 |
| | | | | 726/25 |
| 2014/0337982 | A1* | 11/2014 | Crosby | H04L 63/1433 |
| | | | | 726/25 |
| 2014/0373161 | A1* | 12/2014 | Hudson | H04L 63/1433 |
| | | | | 726/25 |
| 2016/0173520 | A1* | 6/2016 | Foster | G06F 21/316 |
| | | | | 726/25 |
| 2016/0308888 | A1 | 10/2016 | Vargas Gonzalez | |
| 2017/0310699 | A1* | 10/2017 | Gilbert | H04L 63/0245 |
| 2018/0337941 | A1* | 11/2018 | Kraning | H04L 43/10 |
| 2020/0076846 | A1* | 3/2020 | Pandian | G06F 3/04817 |
| 2020/0143036 | A1* | 5/2020 | Sunkavally | G06F 21/46 |
| 2020/0213344 | A1* | 7/2020 | Sivagnanam | H04L 63/20 |
| 2022/0210177 | A1* | 6/2022 | Dayalan | G05B 15/02 |

OTHER PUBLICATIONS

Unknown author, "Nmap", Wikipedia, 9 pages. (Year: 2022).*
Im et al, "Performance Evaluation of Network Scanning Tools with Operation of Firewall", IEEE 2016, 6 pages. (Year: 2016).*
Holmberg, "BACnet Wide Area Network Security Threat Assessment", pp. 1-23, Jul. 2003.
Extended European Search Report, European Patent Application No. 19217382.1, dated May 6, 2020 (9 pages).
Keith Stouffer et al., "Guide to Industrial Control Systems (ICS) Security", NIST Special Publication 800-82 Revision 2, 247 pages, May 2015.
Examination Report, European Patent Application No. 19217382.1, dated Apr. 22, 2022 (6 pages).

* cited by examiner

NETWORK SECURITY MANAGEMENT FOR A BUILDING AUTOMATION SYSTEM

FIELD

This disclosure relates generally to a building automation system. More specifically, this disclosure relates to network security management of the electronic devices within the building automation system.

BACKGROUND

A building automation system is a computerized network of electronic devices that can be configured to control one or more systems such as, but not limited to, mechanical, electrical, lighting, and security systems of a building. A building automation system can be configured to control a heating, ventilation, air conditioning, and refrigeration (HVACR) system and associated components for a building. A user, such as, but not limited to, a facility manager, a building maintenance engineer, or the like, typically interacts with the building automation system via one or more computers that are networked with a variety of equipment controllers and sensors. The user may also be able to interact with the building automation system via one or more mobile devices such as, but not limited to, a cellular phone, a tablet, or the like.

SUMMARY

This disclosure relates generally to a building automation system. More specifically, this disclosure relates to network security management of the electronic devices within the building automation system.

In an embodiment, one of the electronic devices within the building automation system is a system control unit of the building automation system. In an embodiment, the system control unit can be connected to a network of the building automation system and to the Internet.

In an embodiment, one or more of the electronic devices in the building automation system may be capable of being connected to the Internet. In an embodiment, the one or more of the electronic devices may not be intended to be connected to the Internet.

In an embodiment, a user can initiate an electronic security assessment of the system control unit of the building automation system.

In an embodiment, the user can initiate an electronic security assessment of peer devices that are connected in electronic communication with the system control unit via a network of the building automation system.

In an embodiment, the system control unit can be connected to the cloud. In an embodiment, the electronic security assessment can be initiated by the user at a location remote from the building automation system.

In an embodiment, the electronic security assessment can be scheduled so that the electronic security assessment is performed on a periodic basis.

In an embodiment, a cloud-based electronic security assessment can be initiated. In such an embodiment, the cloud-based electronic security assessment can analyze system control units (even those not corresponding to a same building automation system) for security vulnerabilities.

A computer-implemented method for performing an electronic security assessment of a controller in a building automation system is disclosed. The building automation system includes a network of electronic devices connected in electronic communication. The method includes initiating an electronic security scan of the controller. The controller electronically assesses security vulnerabilities of the controller, including identifying one or more of a validation of whether the controller is protected by a firewall or other network security device, identifying which communication ports are open, identifying and verifying an Ethernet and Wi-Fi configuration of the controller, determining whether any routers communicating with the controller are protected by the firewall or other network security device, determining whether the controller is running an up-to-date software or firmware version, and determining a listing of software applications and versions installed on the controller. The controller calculates a risk score and listing of recommendations for resolving security vulnerabilities of the controller based on the electronically assessing security vulnerabilities of the controller.

A building automation system is also disclosed. The building automation system includes a plurality of electronic devices; a controller including a processor and a memory; and a network, where the plurality of electronic devices and the controller are in electronic communication via the network. The processor of the controller is configured to initiate an electronic security scan of the controller and electronically assess security vulnerabilities of the controller, including identifying one or more of a validation of whether the controller is protected by a firewall or other network security device, identifying which communication ports are open, identifying and verifying an Ethernet and Wi-Fi configuration of the controller, determining whether any routers communicating with the controller are protected by the firewall or other network security device, determining whether the controller is running an up-to-date software or firmware version, and determining a listing of software applications and versions installed on the controller. The processor is configured to also calculate a risk score and listing of recommendations for resolving security vulnerabilities of the controller based on the electronically assessing security vulnerabilities of the controller.

BRIEF DESCRIPTION OF THE DRAWINGS

References are made to the accompanying drawings that form a part of this disclosure, and which illustrate embodiments in which the systems and methods described in this specification can be practiced.

Like reference numbers represent like parts throughout.

DETAILED DESCRIPTION

This disclosure relates generally to a building automation system. More specifically, this disclosure relates to network security management of the electronic devices within the building automation system.

A building automation system is a computerized network of electronic devices that can be configured to control one or more systems such as, but not limited to, mechanical, electrical, lighting, and security systems of a building. A building automation system can be configured to control a heating, ventilation, and air conditioning (HVAC) system and its components for a building.

In a building automation system, there may be hundreds or even thousands of electronic devices connected to a local network of the building. In many cases, the electronic devices may also be capable of connecting to the Internet. Such capability can, for example, lead to security vulnerabilities on the local network of the building. As new devices are added or existing devices are modified, settings may inadvertently be configured in a manner that exposes the electronic devices to potential security risks.

A controller of the building automation system may be connected to the Internet and prone to various types of cyberattacks. When systems are installed in an unsecure way, building information, product information (e.g., open ports, operating system, or the like), and the like, may be exposed to Internet searches, especially those that target specific types of devices connected to the Internet (e.g., routers, servers, or the like). If the electronic devices in the building automation system are not securely configured, an attacker can benefit from these search results to exploit security vulnerabilities of the electronic devices and attempt to compromise controllers connected to the Internet.

Embodiments of this disclosure are directed to electronic security assessments conducted by electronic devices in a building automation system that identify potential security vulnerabilities within the building automation system. The methods and systems described can enable corrective action by a user such as, but not limited to, a service technician or the like. The results of the electronic security assessments can be shared (e.g., locally from the controller) with a building manager or other service technicians to identify and resolve security issues. In an embodiment, the controller can be connected to the cloud. In such an embodiment, the results of the electronic security assessments can also be shared with cloud-based services for further analysis, assessment, and reporting.

Embodiments of this disclosure can result in an increased electronic security for the building automation system and its electronically connected components.

Figure 1:
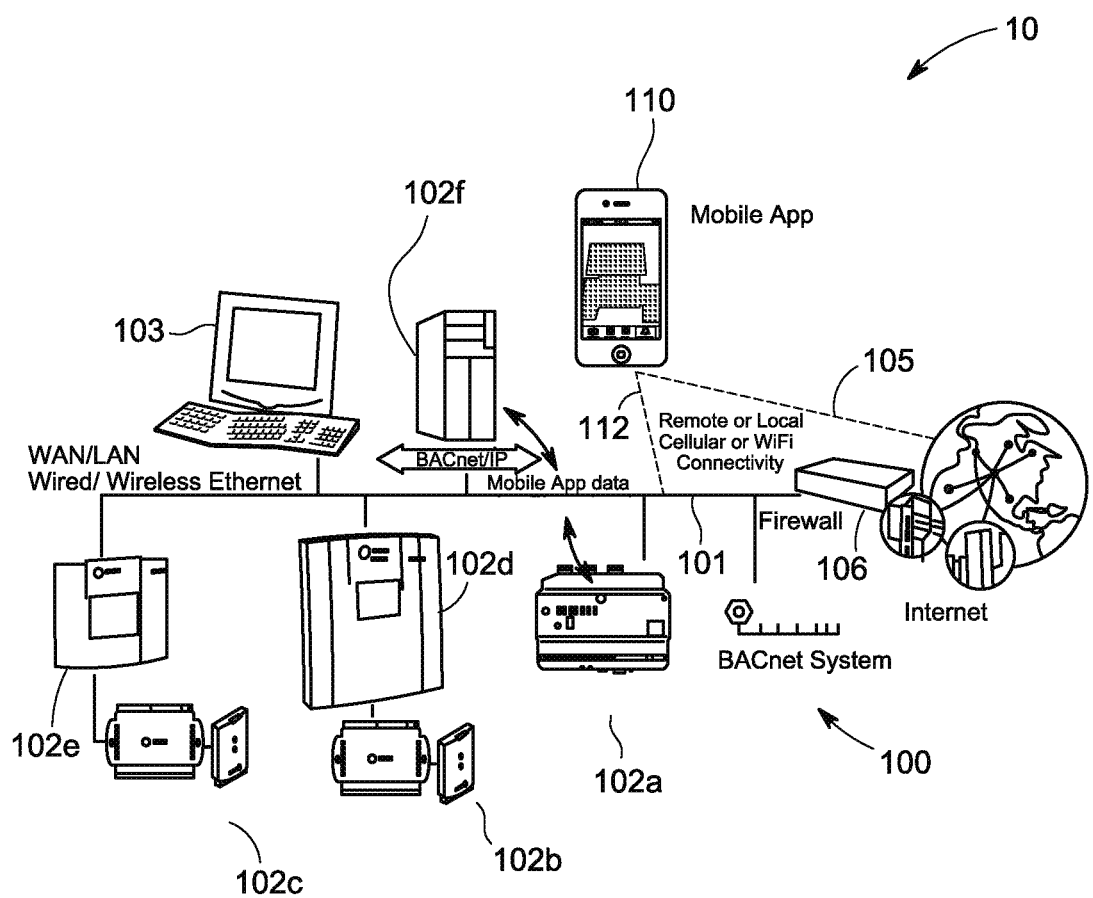
FIG. 1 is a schematic diagram of a system including a building automation system, according to an embodiment.

FIG. 1 is a schematic diagram of a system 10 including a building automation system 100, according to an embodiment.

The building automation system 100 includes a computer 103 specialized to carry out the methods described herein. The computer 103 is connected to a network 101. In an embodiment, the computer 103 can be hardwired to the network 101. In an embodiment, the computer 103 can be wirelessly connected to the network 101.

The network 101 uses a communication standard or protocol to link various subsystems throughout the building automation system 100. For example, the network 101 links a system control unit 102a, a unit control device 102b, a unit control device 102c, and other devices 102d, 102e, 102f. The network 101 can provide system-wide user access and control from the computer 103. The network 101 can also be connected to the cloud via a cellular connection. In an embodiment, the system control unit 102a can be referred to as a master controller for the building automation system.

In an embodiment, the network 101 can utilize a variety of different communication protocols. Examples of suitable communication protocols for the network 101 include, but are not limited to, TCP/IP, BACnet, LonTalk, Modbus, ZigBee, Zwave, Wi-Fi, SIMPLE, Bluetooth, or the like.

The computer 103 can represent a variety of electronic devices. For example, the computer 103 can have a display device and an input device. In an embodiment, the computer 103 can be a desktop computer, a laptop computer, a tablet, a cellular phone (e.g., a smart phone or the like), a personal digital assistant, a local display, a kiosk mode enabled smart device (e.g., television, tablet, or the like), or other suitable electronic device.

The building automation system 100 is connected in electronic communication with the Internet 105. A network security device 106 is included between the Internet 105 and the network 101 of the building automation system 100. It is to be appreciated that the network security device 106 may not be present in an embodiment. In such an embodiment, the methods discussed in accordance with FIGS. 3-6 below might recommend addition of a network security device 106. The network security device 106 can be, for example, a firewall, cellular router, or the like, that secures and protects the building automation system 100 from unwanted intrusion via the Internet 105.

The illustrated embodiment includes a mobile device 110 connected to the building automation system 100 via, for example, the Internet 105 through the network security device 106. The mobile device 110 can alternatively be referred to as a user device. The mobile device 110 is not part of the building automation system 100. The mobile device 110 can connect to the building automation system 100 via a local wireless connection 112. The local wireless connection 112 can be established behind the network security device 106 so that the mobile device 110 can connect to one or more of the components or devices 102a-102f of the building automation system 100 without requiring communication between the mobile device 110 and the building automation system 100 to go through the network security device 106. This can, for example, increase the speed of the communication between the mobile device 110 and the building automation system 100. In an embodiment, the mobile device 110 can be connected to the building automation system 100 via a wired connection.

The mobile device 110 can connect to the building automation system 100 via the Internet 105 using, for example, cellular, 3G, 4G, or other wireless communication protocols. The mobile device 110 can connect to the building automation system 100 via the local wireless connection 112 using, for example, Wi-Fi, Bluetooth, or other wireless communication protocols. The mobile device 110 can connect to the building automation system 100 using, for example, a combination of the Internet 105 and the local wireless connection 112.

Figure 2:
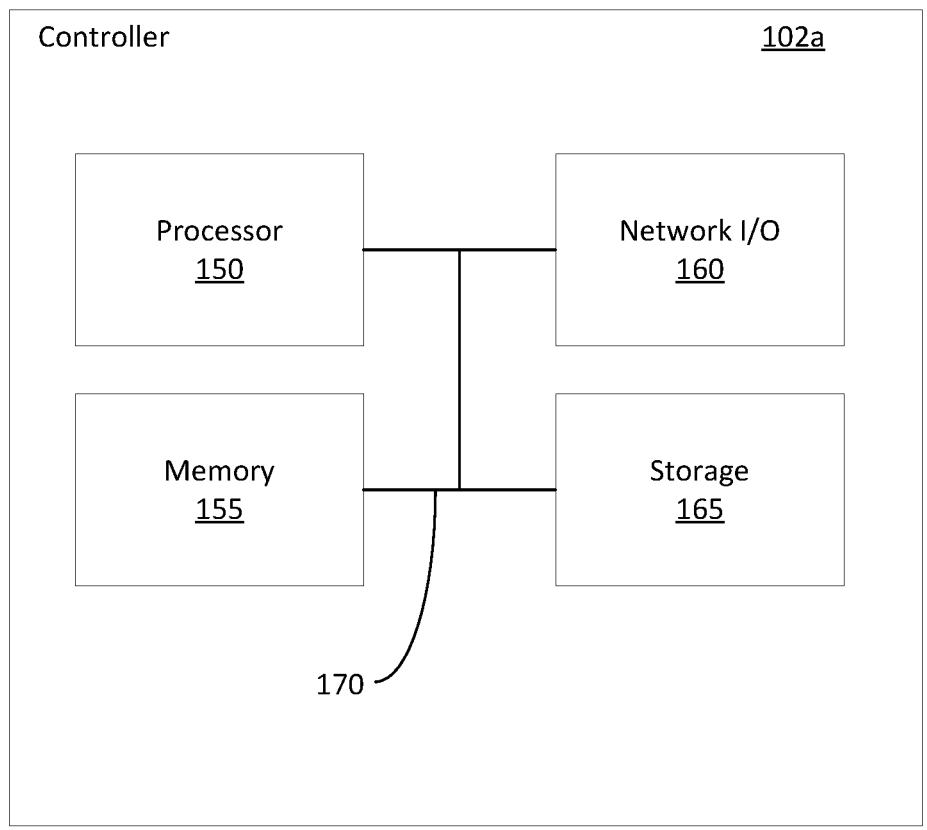
FIG. 2 is a schematic diagram of the system control unit in FIG. 1, according to an embodiment.

FIG. 2 is a schematic diagram of the system control unit 102a in FIG. 1, according to an embodiment.

The system control unit 102a is generally representative of hardware aspects of a controller for the building automation system 100 (FIG. 1). The system control unit 102a is an example and is not intended to be limiting.

The system control unit 102a includes a processor 150, a memory 155, a network input/output 160, and storage 165. It is to be appreciated that the system control unit 102a can include one or more additional components.

The processor 150 can retrieve and execute programming instructions stored in the memory 155 and/or the storage 165. The processor 150 can also store and retrieve application data residing in the memory 155. The processor 150 can be a single processor, multiple processors, co-processors, or a single processor having multiple processing cores. In some embodiments, the processor 150 can be a single-threaded processor. In some embodiments, the processor 150 can be a multi-threaded processor.

An interconnect 170 is used to transmit programming instructions and/or application data between the processor 150, the memory 155, the storage 165, and the network input/output 160. The interconnect 170 can, for example, be one or more busses or the like.

The system control unit 102a includes a relatively limited amount of storage 165. The primary function of the system control unit 102a is to run the building automation control system 100.

The memory 155 is generally included to be representative of a random access memory such as, but not limited to, Static Random Access Memory (SRAM), Dynamic Random Access Memory (DRAM), Flash, suitable combinations thereof, or the like. In some embodiments, the memory 155 can be a volatile memory. In some embodiments, the memory 155 can be a non-volatile memory.

The network input/output 160 can include both wired and wireless connections. The network input/output 160 is configured to transmit data via the network 101. In an embodiment, the network input/output 160 can also be configured to transmit data via the Internet 105. In an embodiment, the network input/output 160 can transmit data via the network 101 through a wireless connection using Wi-Fi, Bluetooth, BACnet, LonTalk, Modbus, ZigBee, Zwave, or the like, or other suitable wireless communication protocols. In an embodiment, the network input/output 160 can transmit data via a wire line, an optical fiber cable, or the like. It is to be appreciated that the network input/output 160 can communicate through the network 101 or through the Internet 105 through suitable combinations of the preceding wired and wireless communication methods. The network 101 can also be connected to the cloud via a cellular connection.

In an embodiment, the system control unit 102a can include one or more other features. For example, in an embodiment, the system control unit 102a can include a co-processor configured to drive an on-board display.

Aspects described herein can be embodied as a system, method, or computer readable medium. In an embodiment, the aspects described can be implemented in hardware, software (including firmware or the like), or combinations thereof. Some aspects can be implemented in a computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result.

Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Some embodiments can be provided to an end-user through a cloud-computing infrastructure. Cloud computing generally includes the provision of scalable computing resources as a service over a network (e.g., the Internet or the like).

Figure 3:
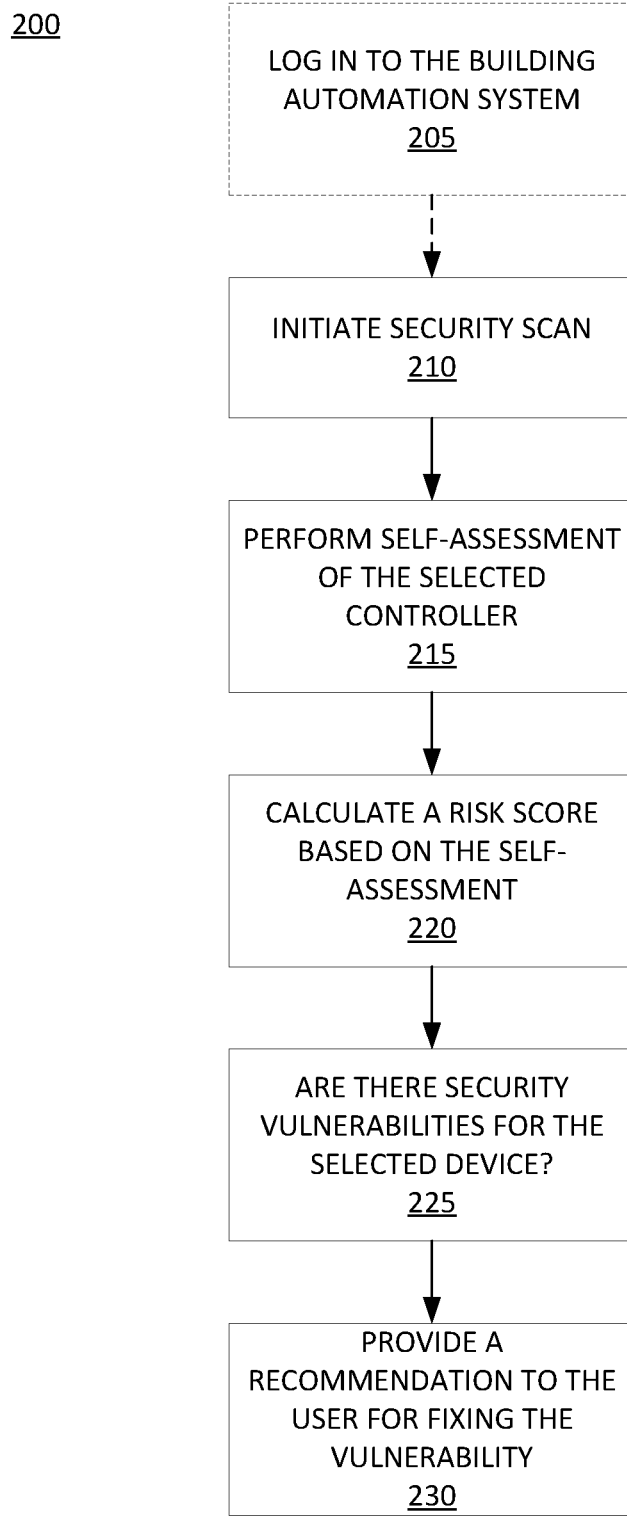
FIG. 3 is a flowchart of a method for conducting an electronic security assessment of a controller in a building automation system, according to an embodiment.

FIG. 3 is a flowchart of a method 200 for conducting an electronic security assessment of a controller in a building automation system (e.g., the building automation system 100 in FIG. 1), according to an embodiment.

In an embodiment, the method 200 can be performed by the system control unit 102a (FIGS. 1 and 2). In another embodiment, the method 200 can be performed by any controller in the building automation system 100. For example, the method 200 can be performed by one of the unit controllers 102b, 102c in the building automation system 100.

The method 200 may generally include electronically assessing a variety of information about the system control unit 102a itself, generating a risk score, risk report, and recommended actions to remedy any security vulnerabilities discovered. As such, the method 200 may be considered to be an electronic security self-assessment of the system control unit 102a.

At 205, a user logs in to the system control unit 102a. The user may log in to the system control unit 102a via, for example, the computer 103 (FIG. 1), the mobile device 110 (FIG. 1), or the like. In the illustrated embodiment, 205 is illustrated in dashed lines as being optional because the user may already be logged in to the system control unit 102a.

At 210 the user initiates the electronic security assessment of the system control unit 102a. In response, the system control unit 102a begins a number of electronic self-assessments at 215. Various examples of the electronic self-assessments are discussed in additional detail below. In an embodiment, the electronic security assessment at 215 can include some, but not all, of these examples. In an embodiment, the electronic security assessment at 215 can include all of these examples, including all of the devices, settings, ports, routers, lists, software, firmware, applications, and the like, and any and all equipment. In an embodiment, other self-assessments may be completed within the scope of this disclosure.

At 215, the electronic security assessment of the system control unit 102a can include determining whether the wired and the wireless communication ports are protected by a network security device (e.g., the network security device 106 in FIG. 1). In an embodiment, this can include assessing an Internet Protocol (IP) address of the wired and wireless communication ports. It is possible for the system control unit 102*a* to determine that a network security device such as the network security device 106 is not present in the building automation system. Based on the outcome of the determination, the system control unit 102*a* can temporarily store the results in a memory (e.g., the memory 155 in FIG. 2) of the system control unit 102*a* for displaying to the user via, for example, a graphical user interface (GUI) such as, but not limited to, the GUI 400 shown and described in additional detail in accordance with FIG. 7 below.

At 215, the electronic security assessment of the system control unit 102*a* can include determining one or more Ethernet configuration settings, one or more Wi-Fi settings, combinations thereof, or the like.

At 215, the electronic security assessment of the system control unit 102*a* can include scanning ports that are identified as being open to the Internet. The scanning of the ports can also inform the user whether the system control unit 102*a* is communicating with the Internet via a hypertext transfer protocol (HTTP) or through a secure hypertext transfer protocol (HTTPS).

At 215, the electronic security assessment of the system can identify connected routers and whether they are connected to the Internet or whether they are protected behind the network security device 106.

At 215, the electronic security assessment of the system control unit 102*a* can include identifying broadcast lists indicating to which electronic devices the system control unit 102*a* is broadcasting.

At 215, the electronic security assessment of the system control unit 102*a* can include determining whether the software and firmware on the system control unit 102*a* is up to date. In an embodiment, the system control unit 102*a* may not be connected to the Internet. In such an embodiment, the software or firmware update status may need an Internet connection for completion.

At 215, the electronic security assessment of the system control unit 102*a* can include identifying software applications, including version information, installed on the system control unit 102*a*. In an embodiment, the user may be responsible for determining whether these applications present any security vulnerabilities or whether any of these software applications are outdated (e.g., a newer version of the software application may be available).

At 220, a risk score is determined based on the information obtained at 215. In an embodiment, the assessments in 215 can be included as a component of the risk score. In an embodiment, the risk score can be weighted so that one or more of the assessments in 215 is a primary factor in determining the risk score. In an embodiment, the risk score can be a numerical value. In an embodiment, the risk score can be provided to the user. In another embodiment, the risk score can factor into recommendations provided to the user, but not be shown to the user. For example, the recommendations can be retrieved from a memory of the system control unit 102*a* based on the risk score.

At 225, the system control unit 102*a* determines whether vulnerabilities are present based on the assessment at 215. The system control unit 102*a* can identify vulnerabilities specific to the assessments. For example, if at 215, no network security device 106 is identified (e.g., no firewall exists between the building automation system 100 and the Internet 105), the system control unit 102*a* can indicate that a security vulnerability is present. In an embodiment, determining whether a security vulnerability is present may be based on, for example, best practices (e.g., industry standards, company guidelines, policies, or the like) to reduce risk of cyberattack.

At 230, the system provides recommendations for fixes to the user. The recommendations for fixes can be based on best practices (e.g., industry standards, company guidelines, policies, or the like) in network security. In an embodiment, there can be a single recommendation for each type of security vulnerability. For example, in an embodiment in which the system control unit 102*a* determines that there is no security device 106, or one of the communication ports is not protected by the firewall, then the recommendation can be to include the network security device 106 or to modify configuration settings so that the communication ports are protected by the firewall. In an embodiment, there may be one or more rules defined that indicate what recommendation should be provided based on the vulnerability identified. In an embodiment, 215 and 225 can be updated to include cloud-based services so that the analysis can be performed via the cloud.

The risk score, vulnerabilities, and recommendations can be presented to the user in a GUI such as the GUI 400 shown and described in accordance with FIG. 7 below.

The method 200 can be executed in response to a user selecting to perform the electronic security assessment. As such, the method 200 can be an on-demand method of identifying security vulnerabilities.

In an embodiment, the method 200 can be scheduled to run on a periodic basis such as, but not limited to, daily, weekly, monthly, or the like. In such an embodiment, a scheduling of the method 200 can be selected based on determining a time in which the system control unit 102*a* is using relatively less bandwidth. An example of such time may be a period in which the building of the building automation system is not occupied. In an embodiment, the method 200 does not impact regular functionality of the system control unit 102*a*.

In an embodiment, the method 200 does not store results of the electronic security assessment. Accordingly, when the method 200 is executed, the complete method is performed. It will be appreciated that the method 200 could include storing the results of the electronic security assessment in a storage device of the system control unit 102*a*.

In an embodiment in which the system control unit 102*a* is connected to the cloud, results of the electronic security assessment may be stored via the cloud. In such an embodiment, when the method 200 is performed again, the method can be used to highlight changes since the last time the method 200 was performed. In an embodiment, even when connected to the cloud, the method 200 may be completely performed when the method 200 is initiated.

In an embodiment, the system control unit 102*a* can be connected to one or more cloud-based analytic services. For example, the product owner selling the system control unit 102*a* may offer cloud-based services. If the system control unit 102*a* is connected to one or more cloud-based analytic services, the method 200 can output results to the cloud for storage and further processing. Examples of such a method are discussed in additional detail in accordance with FIG. 6 below.

In an embodiment, the method 200 can additionally be configured so that, in response to identifying a security vulnerability, instead of providing a recommendation at 230, the system control unit 102*a* modifies its own security setting automatically to follow the best practices (e.g., industry standards, company guidelines, policies, or the like)

which are typically recommended to the user. In an embodiment, the method 200 can include recommending a modified setting to the user, which the user can then choose to accept and complete the modification, or can choose not to accept and keep the current settings for the system control unit 102*a*. In an embodiment, the user may be required to accept and complete a modification to continue use.

Figure 4:
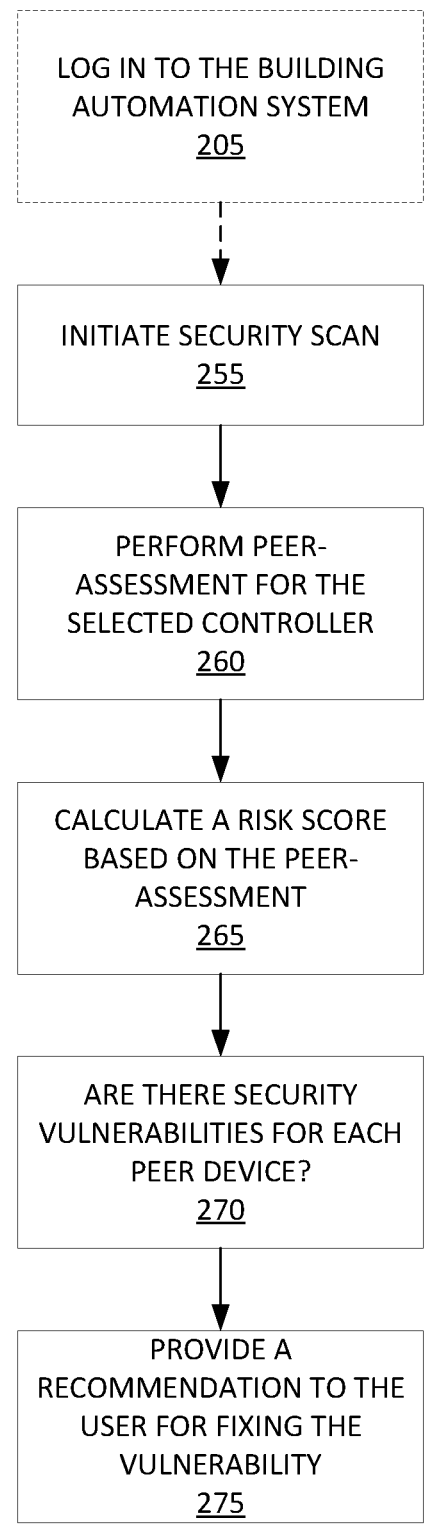
FIG. 4 is a flowchart of a method for conducting an electronic security assessment of one or more electronic devices electronically connected to a controller of a building automation system, according to an embodiment.

FIG. 4 is a flowchart of a method 250 for conducting an electronic security assessment of one or more electronic devices electronically connected to a controller of a building automation system (e.g., the building automation system 100 in FIG. 1), according to an embodiment.

In an embodiment, the method 250 can be performed by the system control unit 102*a* (FIG. 1). In another embodiment, the method 250 can be performed by any controller in the building automation system 100. For example, the method 250 can be performed by one of the unit controllers 102*b*, 102*c* in the building automation system 100.

The method 250 may generally include assessing a variety of information about the electronic devices (e.g., 102*b*-102*f*) that are electronically connected to the system control unit 102*a*, generating a risk score, risk report, and recommended actions to remedy any security vulnerabilities discovered.

The method 250 may include similar electronic assessments as those in the method 200 of FIG. 3. However, the method 250 may differ from the method 200 in scope of the electronic devices being analyzed.

The method 200, as discussed above, may be performed to determine an electronic security assessment of the system control unit 102*a*. The method of 250, performed by the system control unit 102*a*, may perform an electronic security assessment of the unit controllers (e.g., 102*b*, 102*c* in FIG. 1) or other devices (e.g., 102*d*-102*f* in FIG. 1) that are connected in electronic communication with the system control unit 102*a* over the network 101. The method 250 may accordingly be considered to be an electronic security assessment of peers of the system control unit 102*a* on the network 101.

In an embodiment, the method 250 can be performed by a unit controller (102*b*, 102*c*) instead of the system unit controller 102*a*. In such an embodiment, the method 250 may be considered to be an electronic security assessment of peers of the unit controllers 102*b*, 102*c* on the network 101.

At 205, a user logs in to the system control unit 102*a*. The user may log in to the system control unit 102*a* via, for example, the computer 103 (FIG. 1), the mobile device 110 (FIG. 1), or the like. In the illustrated embodiment, 205 is illustrated in dashed lines as being optional because the user may already be logged in to the system control unit 102*a*.

At 255 the user initiates the electronic security assessment of the devices connected (e.g., peer devices) in communication with the system control unit 102*a*. In response, the system control unit 102*a* begins a number of electronic peer-assessments at 260. Various examples of the electronic peer-assessments are discussed in additional detail below. In an embodiment, the electronic security assessment at 260 can include some, but not all, of these examples. In an embodiment, the electronic security assessment at 260 can include all (or less than all) of these examples, including all of the devices, settings, ports, routers, lists, software, firmware, applications, and the like, and any and all equipment. In an embodiment, other peer-assessments may be completed within the scope of this disclosure.

At 260, for the peer devices connected in electronic communication with the system control unit 102*a*, the electronic security assessment of the peer devices can include determining whether the wired and the wireless communication ports of the peer device are protected by a network security device (e.g., the network security device 106 in FIG. 1). In an embodiment, this can include assessing an Internet Protocol (IP) address of the wired and wireless communication ports. It is possible for the system control unit 102*a* to determine that a network security device such as the network security device 106 is not present in the building automation system. Based on the outcome of the determination, the system control unit 102*a* can temporarily store the results in a memory (e.g., the memory 155 in FIG. 2) of the system control unit 102*a* for displaying to the user via, for example, a graphical user interface (GUI) such as, but not limited to, the GUI 400 shown and described in additional detail in accordance with FIG. 7 below.

At 260, for the peer devices connected in electronic communication with the system control unit 102*a*, the electronic security assessment of the peer devices can include determining one or more Ethernet configuration settings, one or more Wi-Fi settings, combinations thereof, or the like.

At 260, for the peer devices connected in electronic communication with the system control unit 102*a*, the electronic security assessment of the peer devices can include scanning ports that are identified as being open to the Internet. The scanning of the ports can also, for example, inform the user whether the peer devices are communicating with the Internet via a hypertext transfer protocol (HTTP) or through a secure hypertext transfer protocol (HTTPS).

At 260, for the peer devices connected in electronic communication with the system control unit 102*a*, the electronic security assessment of the peer devices can identify connected routers and whether they are connected to the Internet or whether they are protected behind the network security device 106.

At 260, for the peer devices connected in electronic communication with the system control unit 102*a*, the electronic security assessment of the peer devices can include identifying broadcast lists indicating to which electronic devices the peer devices are broadcasting.

At 260, for the peer devices connected in electronic communication with the system control unit 102*a*, the electronic security assessment of the peer devices can include determining whether the software and firmware on the peer devices is up to date. In an embodiment, the system control unit 102*a* or the peer devices may not be connected to the Internet. In such an embodiment, the software or firmware update status may need an Internet connection for completion.

At 260, for the peer devices connected in electronic communication with the system control unit 102*a*, the electronic security assessment of the peer devices can include identifying software applications, including version information, installed on the peer devices. In an embodiment, the user may be responsible for determining whether these applications present any security vulnerabilities or whether any of these software applications are outdated (e.g., a newer version of the software application may be available).

At 265, a risk score is determined based on the information obtained at 260. In an embodiment, the assessments in 260 can be included as a component of the risk score. In an embodiment, the risk score can be weighted so that one or more of the assessments in 260 is a primary factor in determining the risk score. In an embodiment, the risk score can be a numerical value. In an embodiment, the risk score can be provided to the user. In another embodiment, the risk score can factor into recommendations provided to the user, but not be shown to the user.

At 270, the system control unit 102a determines whether any vulnerabilities are present based on the assessment at 260. The system control unit 102a can identify vulnerabilities specific to the assessments. For example, if at 260, no network security device 106 is identified (e.g., no firewall exists between the building automation system 100 and the Internet 105), the system control unit 102a can indicate that a security vulnerability is present. In an embodiment, determining whether a security vulnerability is present may be based on, for example, best practices (e.g., industry standards, company guidelines, policies, or the like) to reduce risk of cyberattack.

At 275, the system provides recommendations for fixes to the user. The recommendations for fixes can be based on best practices (e.g., industry standards, company guidelines, policies, or the like) in network security. In an embodiment, there can be a single recommendation for each type of security vulnerability. For example, in an embodiment in which the system control unit 102a determines that there is no security device 106, or one of the communication ports is not protected by the firewall, then the recommendation can be to include the network security device 106 or to modify configuration settings so that the communication ports are protected by the firewall. In an embodiment, there may be one or more rules defined that indicate what recommendation should be provided based on the vulnerability identified. In an embodiment, 265 and 275 can be updated to include cloud-based services so that the analysis can be performed via the cloud.

The risk score, vulnerabilities, and recommendations can be presented to the user in a GUI such as the GUI 400 shown and described in accordance with FIG. 7 below. In an embodiment, because the method 250 includes electronically assessing security vulnerabilities for a plurality of electronic devices, the report to the user may present problems identified instead of reinforcing good practices already followed in the configuration of the building automation system.

The method 250 can be executed in response to a user selecting to perform the electronic security assessment. As such, the method 250 can be an on-demand method of identifying security vulnerabilities.

In an embodiment, the method 250 can be scheduled to run on a periodic basis such as, but not limited to, daily, weekly, monthly, or the like. In such an embodiment, a scheduling of the method 250 can be selected based on determining a time in which the system control unit 102a is using relatively less bandwidth. An example of such time may be a period in which the building of the building automation system is not occupied.

In an embodiment, the method 250 does not store results of the electronic security assessment. Accordingly, when the method 250 is executed, the complete method is performed. It will be appreciated that in an embodiment, the method 250 can store results of the electronic security assessment on a storage medium of the system control unit 102a.

In an embodiment in which the system control unit 102a is connected to the cloud, results of the electronic security assessment may be stored via the cloud. In such an embodiment, when the method 250 is performed again, the method can be used to highlight changes since the last time the method 250 was performed. In an embodiment, even when connected to the cloud, the method 250 may be completely performed when the method 250 is initiated.

In an embodiment, the system control unit 102a can be connected to one or more cloud-based analytic services. For example, the product owner (e.g., manufacturer, provider, or the like) selling the system control unit 102a may offer cloud-based services. If the system control unit 102a is connected to one or more cloud-based analytic services, the method 250 can output results to the cloud for storage and further processing. Examples of such a method are discussed in additional detail in accordance with FIG. 6 below.

In an embodiment, the method 250 can additionally be configured so that, in response to identifying a security vulnerability, instead of providing a recommendation at 275, the system control unit 102a modifies its own security setting automatically to follow the best practices (e.g., industry standards, company guidelines, policies, or the like) which are typically recommended to the user. In an embodiment, the method 250 can include recommending a modified setting to the user, which the user can then choose to accept and complete the modification, or can choose not to accept and keep the current settings for the system control unit 102a. In an embodiment, the user may be required to accept and complete a modification to continue use.

In an embodiment, the method 250 can be combined with the method 200 to provide a single electronic security assessment of the building automation system 100. That is, the method 250 can be performed following 230 in the method of FIG. 3. In an embodiment, the method 250 can be performed separately from the method 200.

Figure 5:
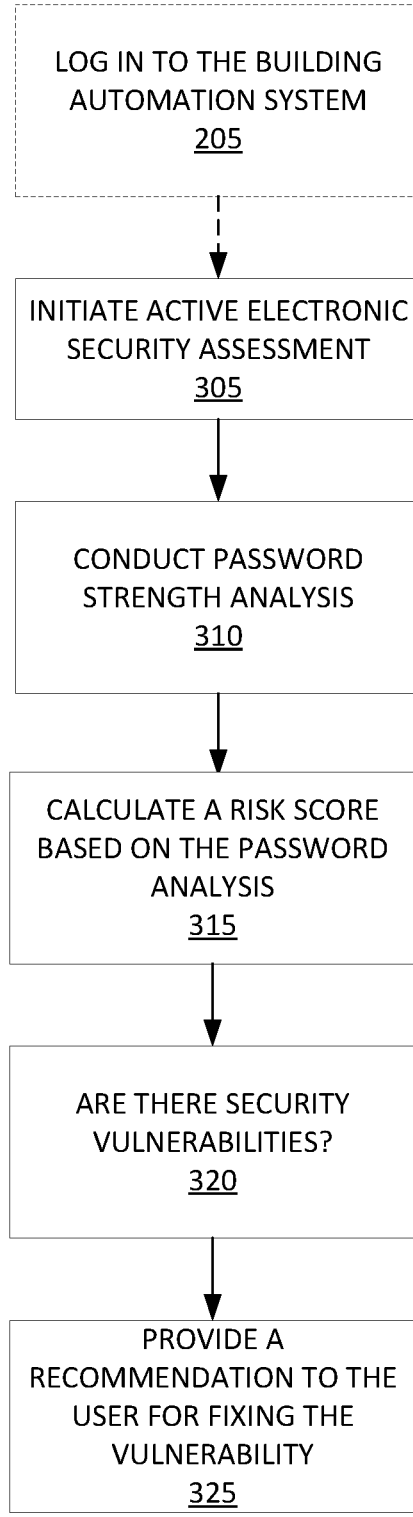
FIG. 5 is a flowchart of a method for conducting an electronic security assessment of a controller in a building automation system, according to an embodiment.

FIG. 5 is a flowchart of a method 300 for conducting an electronic security assessment of a controller in a building automation system (e.g., the building automation system 100 in FIG. 1), according to an embodiment.

The method 300 generally includes an active electronic security assessment of the building automation system. That is, in the methods shown and described above with respect to FIGS. 3 and 4, the method generally include a passive electronic security assessment in which descriptive states of various components are gathered. In the method 300, the active electronic security assessment generally includes an attempt at gaining improper access to the system control unit 102a or the network 101 generally.

At 205, a user logs in to the system control unit 102a. The user may log in to the system control unit 102a via, for example, the computer 103 (FIG. 1), the mobile device 110 (FIG. 1), or the like. In the illustrated embodiment, 205 is illustrated in dashed lines as being optional because the user may already be logged in to the system control unit 102a.

At 305, the system control unit 102a initiates an active electronic assessment. This can include a variety of ways of attempting to gain access to the system control unit 102a itself or to the network 101. In an embodiment, the system control unit 102a may instruct an application that is on a remote computer to attempt to gain access to the network 101, the system control unit 102a, or both the network 101 and the system control unit 102a.

At 310, an electronic analysis of password strength can be conducted. This analysis can include, for example, any method of reviewing a strength of passwords associated with the building automation system 100. For example, a brute force attack can be carried out to try gaining access to the system control unit 102a. A brute force attack generally includes attempting to gain access by trying a variety of username and password combinations to see if any successfully enable authorization to the system control unit 102a and/or the network 101. Criteria around the password policy can also be reviewed at 310. For example, criteria can include guidelines for what is required (e.g., numbers, characters, symbols, length of the password, or the like) in a password can be reviewed.

At 315, a risk score is determined based on the information obtained at 310. In an embodiment, the password assessments in 310 can be included as a component of the risk score. In an embodiment, the risk score can be weighted so that one or more of the assessments in 310 is a primary factor in determining the risk score. In an embodiment, the risk score can be a numerical value.

At 320, the system control unit 102a determines whether any vulnerabilities are present based on the assessment at 315. The system control unit 102a can identify vulnerabilities specific to the assessments. For example, if at 315, the brute force attack was successfully authenticated, then a security vulnerability (e.g., a weak password) is present. In an embodiment, determining whether a security vulnerability is present may be based on, for example, best practices (e.g., industry standards, company guidelines, policies, or the like) to reduce risk of cyberattack.

At 325, the system provides recommendations for fixes to the user. The recommendations for fixes can be based on best practices (e.g., industry standards, company guidelines, policies, or the like) in network security. In an embodiment, there can be a single recommendation for each type of security vulnerability. For example, in an embodiment in which the system control unit 102a successfully authenticates using a brute force attack, then the system control unit 102a can recommend that a more secure password be used.

The risk score, vulnerabilities, and recommendations can be presented to the user in a GUI such as the GUI 400 shown and described in accordance with FIG. 7 below.

The method 300 can be executed in response to a user selecting to perform the electronic security assessment. As such, the method 300 can be an on-demand method of identifying security vulnerabilities.

In an embodiment, the method 300 can be scheduled to run on a periodic basis such as, but not limited to, daily, weekly, monthly, or the like. In such an embodiment, a scheduling of the method 300 can be selected based on determining a time in which the system control unit 102a is using relatively less bandwidth. An example of such time may be a period in which the building of the building automation system is not occupied.

In an embodiment, the method 300 does not store results of the electronic security assessment. Accordingly, when the method 300 is executed, the complete method is performed.

In an embodiment, the system control unit 102a can be connected to one or more cloud-based analytic services. For example, the product owner (e.g., manufacturer, provider, or the like) selling the system control unit 102a may offer cloud-based services. If the system control unit 102a is connected to one or more cloud-based analytic services, the method 300 can output results to the cloud for storage and further processing. Examples of such a method are discussed in additional detail in accordance with FIG. 6 below.

In an embodiment, the method 300 can be combined with the method 200, the method 250, or a combination of the method 200 and the method 250, to provide a single electronic security assessment of the building automation system 100.

Figure 6:
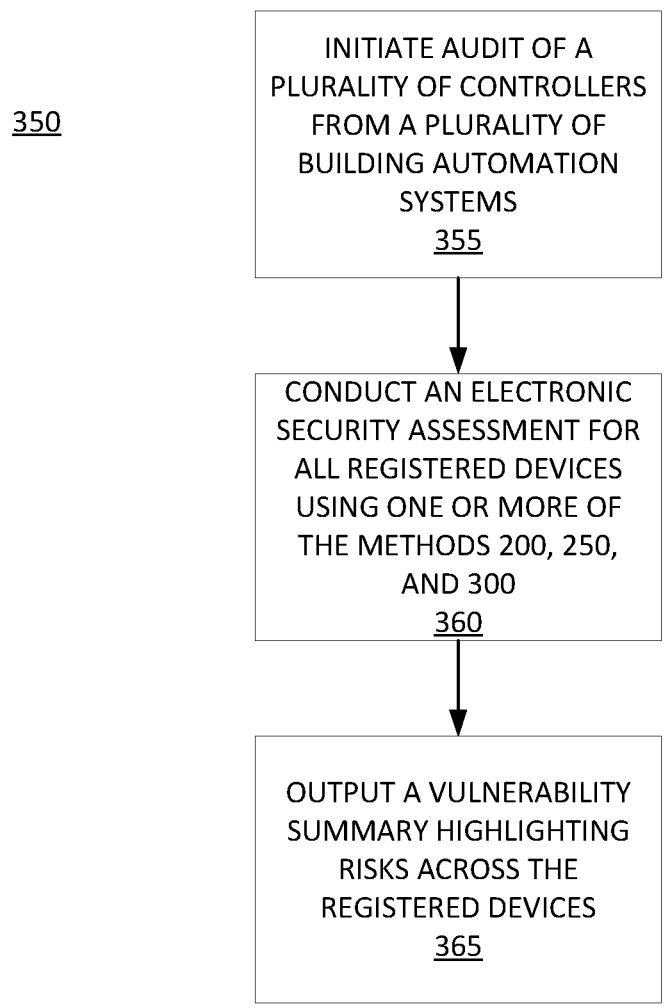
FIG. 6 is a flowchart of a method for conducting an electronic security assessment for a plurality of building automation systems connected to the cloud, according to an embodiment.

FIG. 6 is a flowchart of a method 350 for conducting an electronic security assessment for a plurality of building automation systems (e.g., the building automation systems 100 in FIG. 1) connected to the cloud, according to an embodiment.

The method 350 can generally include initiating a scan of a plurality of controllers across a plurality of building automation systems. For example, the seller of the controllers can manage a cloud-based service (e.g., as discussed above) that any owner of the controller can opt-in to. In such an embodiment, the seller can initiate the method 350 for performing an electronic security assessment of controllers where the owner has opted-in to the cloud-based services.

At 355, a user can initiate an audit of a plurality of registered controllers. As indicated above, the plurality of registered controllers can include those controllers which have been identified as opted-in to cloud-based services. In an embodiment, at 355, the audit of the plurality of registered controllers can include all registered controllers. In an embodiment, at 355, the audit of the plurality of registered controllers can include less than all of the registered controllers. For example, the user may be able to select a region or location (e.g., city, state, or the like) on which to focus, or the like.

At 360, the cloud-based service causes at least one of the methods 200, 250, and 300 to be executed for the registered controllers. In an embodiment, at 360, all three methods can be performed on the registered controllers.

At 365, the cloud-based service can output a vulnerability summary including a listing of vulnerabilities in the registered controllers. The report can, for example, be used to inform the building manager(s) or service technician(s) at the respective locations that a controller on their network has security vulnerabilities that may need action to resolve.

Figure 7:
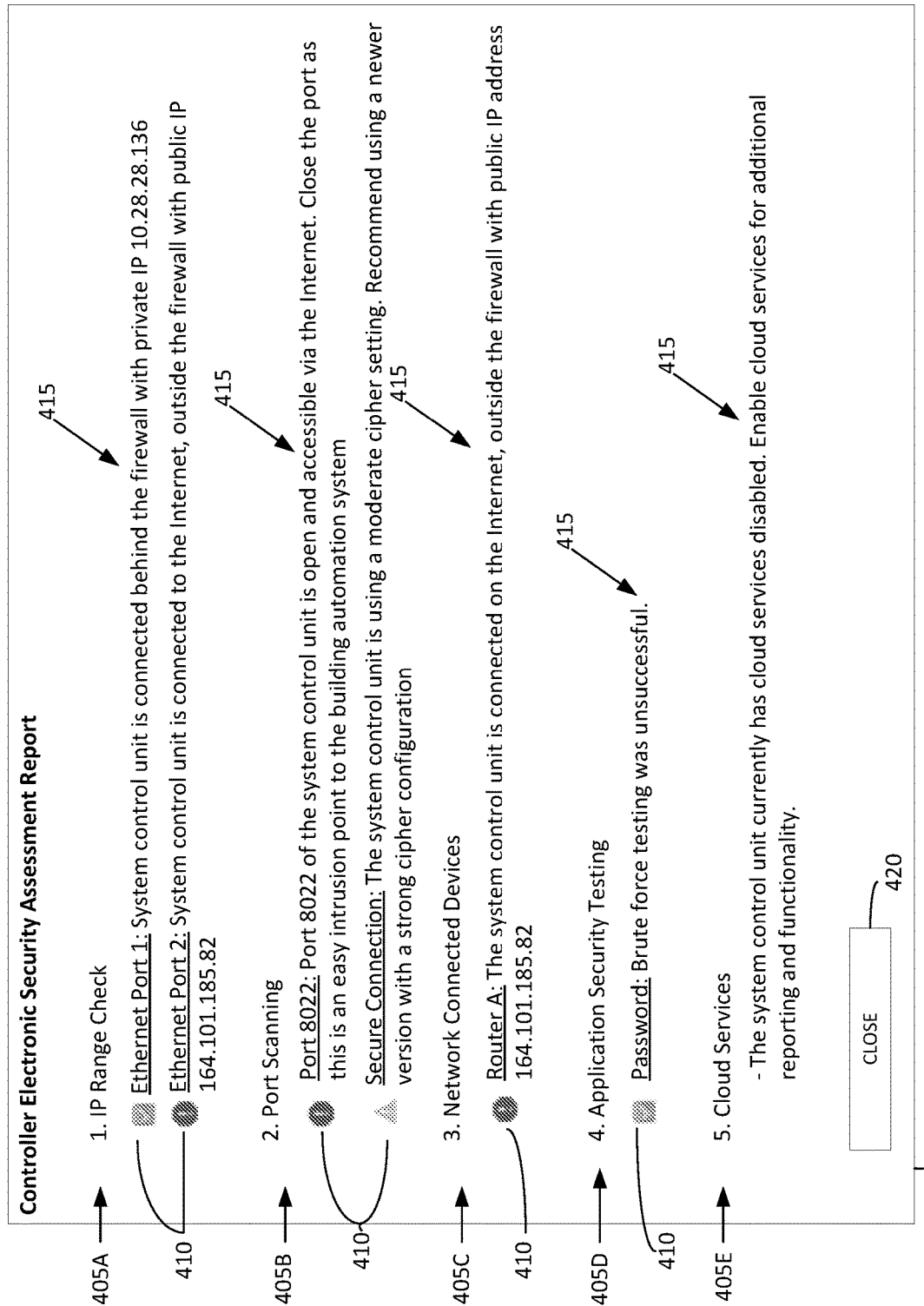
FIG. 7 is an example graphical user interface (GUI) showing results of an electronic security assessment, according to an embodiment.

FIG. 7 is an example graphical user interface (GUI) 400 showing results of an electronic security assessment, according to an embodiment.

The GUI 400 may be displayed on a display device of a computer (e.g., the computer 103 in FIG. 1) or mobile device (e.g., the mobile device 110 in FIG. 1). The GUI 400 is generally representative of an output of an electronic security assessment (e.g., as discussed in FIGS. 3-6 above).

It is to be appreciated that the text and images in the GUI 400 are intended as an example. Accordingly, the text, look-and-feel, and images in the GUI 400 can vary beyond what is shown in FIG. 7 in accordance with the principles described in this Specification.

The GUI 400 can show results of the electronic security assessment. In an embodiment, the results of the electronic security assessment can be broken down into separate categories 405A-405E. It is to be appreciated that a number of categories 405A-405E is representative and can vary beyond what is shown in FIG. 7. An order of the categories is representative as well.

In an embodiment, the GUI 400 may be scrollable to show additional information. Any manner of scrolling the GUI 400 is applicable. For example, a user may be able to use a scrollbar; the user may be able to drag the GUI 400 (e.g., if the user display device includes a touchscreen input integrated with the display device); the GUI 400 may be paginated so that a user can select the various pages; or the like.

Within the categories 405A-405E is a summary of the results of the electronic security assessment of the categories 405A-405E.

In the illustrated embodiment, the category 405A can show details of an assessment of a network security device (e.g., firewall). In the illustrated embodiment, the category 405B can show a summary of the results for whether the ports of the system control unit 102a are protected by a firewall (e.g., network security device 106) or not. In the illustrated embodiment, the results for the category 405B include a summary for ports of the system control unit 102a. In an embodiment, the results summary can be limited to those ports of the system control unit 102a that are not protected by a firewall. In the illustrated embodiment, the category 405C can show the peer devices and router devices connected to the controller being assessed. In the illustrated embodiment, the category 405D can show assessment details of application/device/software/firmware. In the illustrated embodiment, the category 405E can show whether the cloud services are enabled in the controller and the security assessments can be executed on registered device from the cloud and cloud analytics performed on the findings across the registered devices.

The summary results can include an image or other visual indicator 410. The indicator 410 can graphically indicate to the user what type of information is being shown in the results summary 415. The indicators 410 may highlight areas of interest such as those that are a security risk. In an embodiment, there may be an indicator 410 along with the result summary. In such an embodiment, the indicators 410 may highlight areas of interest including those in which the security assessment revealed limited or no risks.

The GUI 400 can include a button 420 for the user to close the GUI 400. In an embodiment, the GUI 400 can include another button or buttons. For example, the user may be provided with an option to save the report, export the report, send the report to the cloud, or the like.

ASPECTS

It is noted that any of aspects 1-9 can be combined with any one of aspects 10-16.

Aspect 1. A computer-implemented method for performing an electronic security assessment of a controller in a building automation system, the building automation system including a network of electronic devices connected in electronic communication, the method comprising: initiating an electronic security scan of the controller; electronically assessing, by the controller, security vulnerabilities of the controller, including identifying one or more of a validation of whether the controller is protected by a firewall or other network security device, identifying which communication ports are open, identifying and verifying an Ethernet and Wi-Fi configuration of the controller, determining whether any routers communicating with the controller are protected by the firewall or other network security device, determining whether the controller is running an up-to-date software or firmware version, and determining a listing of software applications and versions installed on the controller; and calculating a risk score and listing of recommendations for resolving security vulnerabilities of the controller based on the electronically assessing security vulnerabilities of the controller.

Aspect 2. The computer-implemented method of aspect 1, wherein the controller is a system control unit serving as a master controller for the building automation system.

Aspect 3. The computer-implemented method of one of aspects 1 or 2, wherein the controller is a unit controller in the building automation system.

Aspect 4. The computer-implemented method of one of aspects 1-3, wherein the controller is connected in electronic communication with a cloud-based service.

Aspect 5. The computer-implemented method of aspect 4, further comprising sending one or more results from the electronic security assessment to the cloud-based service.

Aspect 6. The computer-implemented method of one of aspects 1-5, further comprising sending the risk score and the listing of recommendations for resolving security vulnerabilities of the controller to a computer for display on a display device of the computer.

Aspect 7. The computer-implemented method of one of aspects 1-6, further comprising electronically assessing, by the controller, security vulnerabilities of the electronic devices connected in electronic communication with the controller.

Aspect 8. The computer-implemented method of one of aspects 1-7, further comprising actively attempting to connect to the controller or one of the plurality of electronic devices by a brute force attack.

Aspect 9. The computer-implemented method of one of aspects 1-8, wherein the method is scheduled to be performed on a periodic basis.

Aspect 10. A building automation system, comprising: a plurality of electronic devices; a controller including a processor and a memory; a network, the plurality of electronic devices and the controller in electronic communication via the network, wherein the processor of the controller is configured to: initiate an electronic security scan of the controller; electronically assess security vulnerabilities of the controller, including identifying one or more of a validation of whether the controller is protected by a firewall or other network security device, identifying which communication ports are open, identifying and verifying Ethernet and Wi-Fi configuration of the controller, determining whether any routers communicating with the controller are protected by the firewall or other network security device, determining whether the controller is running an up-to-date software or firmware version, determining a password policy, and determining a listing of software applications and versions installed on the controller; and calculate a risk score and listing of recommendations for resolving security vulnerabilities of the controller based on the electronically assessing security vulnerabilities of the controller.

Aspect 11. The building automation system of aspect 10, wherein the controller is a system control unit serving as a master controller for the building automation system.

Aspect 12. The building automation system of one of aspects 10 or 11, wherein the controller is a unit controller in the building automation system.

Aspect 13. The building automation system of one of aspects 10-12, wherein the controller is connected in electronic communication with a cloud-based service.

Aspect 14. The building automation system of aspect 13, wherein the controller is configured to send one or more results from the electronic security assessment to the cloud-based service.

Aspect 15. The building automation system of one of aspects 10-14, further comprising a computer in electronic communication with the controller, wherein the controller is configured to send the risk score and the listing of recommendations for resolving security vulnerabilities of the controller to the computer for display on a display device of the computer.

Aspect 16. The building automation system of one of aspects 10-15, wherein the controller is configured to electronically assess security vulnerabilities of the electronic devices connected in electronic communication with the controller.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A computer-implemented method for performing an electronic security self-assessment of a controller in a building automation system, the building automation system including a network of electronic devices connected in electronic communication, the method comprising:
   initiating an electronic security scan of the controller;
   electronically self-assessing, by the controller, security vulnerabilities of the controller, the self-assessing including:
      identifying one or more of a validation of whether the controller is protected by a firewall or other network security device,
      identifying which communication ports are open,
      identifying and verifying an Ethernet and Wi-Fi configuration of the controller,
      determining whether any routers communicating with the controller are protected by the firewall or other network security device,
      determining whether the controller is running an up-to-date software or firmware version,
      determining a listing of software applications and versions installed on the controller, and
      instructing an application on a remote computer to attempt to gain improper access to the controller, the attempt including:
         conducting analysis of password strength for accessing the network of electronic devices as part of a controller instructed attack to gain access to the controller; and
   determining a listing of recommendations for resolving security vulnerabilities of the controller based on the electronically self-assessed security vulnerabilities of the controller,
      wherein the recommendations are based on at least one of industry standards or company guidelines.

2. The computer-implemented method of claim 1, wherein the controller is a system control unit serving as a master controller for the building automation system.

3. The computer-implemented method of claim 1, wherein the controller is a unit controller in the building automation system.

4. The computer-implemented method of claim 1, wherein the controller is connected in electronic communication with a cloud-based service.

5. The computer-implemented method of claim 4, further comprising sending one or more results from the electronic security self-assessment of vulnerabilities of the controller and of the network of electronic devices connected in electronic communication with the controller to the cloud-based service.

6. The computer-implemented method of claim 1, further comprising calculating a risk score based on the electronically self-assessed security vulnerabilities of the controller.

7. The computer-implemented method of claim 1, wherein the conducting of the analysis of password strength includes attempting to connect to the controller or one of the plurality of electronic devices by a brute force attack.

8. The computer-implemented method of claim 1, wherein the method is scheduled to be performed on a periodic basis.

9. The computer-implemented method of claim 6, further comprising sending the risk score and the listing of recommendations for resolving security vulnerabilities of the controller to a computer for display on a display device of the computer.

10. The computer-implemented method of claim 1, wherein the network of electronic devices are connected in electronic communication via a BACnet protocol.

11. A building automation system, comprising:
   a plurality of electronic devices;
   a controller including a processor and a memory;
   a network, the plurality of electronic devices and the controller in electronic communication via the network,
   wherein the processor of the controller is configured to:
      initiate an electronic security scan of the controller;
      electronically self-assess security vulnerabilities of the controller, including:
         identifying one or more of a validation of whether the controller is protected by a firewall or other network security device,
         identifying which communication ports are open,
         identifying and verifying an Ethernet and Wi-Fi configuration of the controller,
         determining whether any routers communicating with the controller are protected by the firewall or other network security device,
         determining whether the controller is running an up-to-date software or firmware version,
         determining a listing of software applications and versions installed on the controller, and
         instructing an application on a remote computer to attempt to gain improper access to the controller, the attempt including:
            conducting analysis of password strength for accessing the network of electronic devices as part of a controller instructed brute force attack to gain access to the controller; and
      determine a listing of recommendations for resolving security vulnerabilities of the controller based on the electronically self-assessing security vulnerabilities of the controller,
         wherein the recommendations are based on at least one of industry standards or company guidelines.

12. The building automation system of claim 11, wherein the controller is a system control unit serving as a master controller for the building automation system.

13. The building automation system of claim 11, wherein the controller is a unit controller in the building automation system.

14. The building automation system of claim 11, wherein the controller is connected in electronic communication with a cloud-based service.

15. The building automation system of claim 14, wherein the controller is configured to send one or more results from the electronic self-assessment to the cloud-based service.

16. The building automation system of claim 11, wherein the controller is configured to calculate a risk score based on the electronic self-assessment by the controller.

17. The building automation system of claim 16, further comprising a computer in electronic communication with the controller, wherein the controller is configured to send the risk score and the listing of recommendations for resolving security vulnerabilities of the controller to the computer for display on a display device of the computer.

18. The building automation system of claim 11, wherein the network is connected in electronic communication via a BACnet protocol.

* * * * *